March 13, 1962 E. J. HOUDRY 3,024,593
CATALYTIC EXHAUST PURIFIER FOR ENGINES
OPERATING ON LEADED GASOLINE
Filed May 23, 1958 2 Sheets-Sheet 1

INVENTOR.
EUGENE J. HOUDRY
BY
ATTORNEYS

March 13, 1962 E. J. HOUDRY 3,024,593
CATALYTIC EXHAUST PURIFIER FOR ENGINES
OPERATING ON LEADED GASOLINE
Filed May 23, 1958 2 Sheets-Sheet 2

INVENTOR.
EUGENE J. HOUDRY
BY
ATTORNEYS

United States Patent Office 3,024,593
Patented Mar. 13, 1962

3,024,593
CATALYTIC EXHAUST PURIFIER FOR ENGINES OPERATING ON LEADED GASOLINE
Eugene J. Houdry, Ardmore, Pa., assignor to Oxy-Catalyst, Inc., Wayne, Pa., a corporation of Pennsylvania
Filed May 23, 1958, Ser. No. 737,424
6 Claims. (Cl. 60—30)

This invention relates to the catalytic elimination of hydrocarbons and oxygenated organic compounds from the exhaust gases of spark-fired internal combustion engines operating on leaded gasoline.

The problem of the purification of exhaust from internal combustion engines, particularly those emitted by automotive vehicle engines, is one of long standing. Many devices, both catalytic and non-catalytic, have been proposed as a solution for this problem. In the past, however, these suggestions have been concerned with the general purification of the exhaust gases, with particular emphasis in most cases on the elimination of carbon monoxide.

In recent years, however, it has been established that the real problem connected with internal combustion engine exhaust gases is not that of carbon monoxide elimination, but rather that of the elimination of the hydrocarbons and oxygenated organic compounds contained in the exhaust gases. While these occur in much smaller concentrations than carbon monoxide, it has been found that these constituents are chiefly responsible for the serious air pollution problems that are now plaguing large cities.

After many years of intensive investigation it has been found that the problems involved in the catalytic elimination of the relatively small concentrations of hydrocarbons and oxygenated compounds in the exhaust gases are much more difficult than those involved in the reduction or elimination of carbon monoxide. In particular, it has been found that the effective elimination of carbon monoxide is not necessarily accompanied by an effective elimination of these other constituents.

It has further been found that the inherent difficulties connected with the effective elimination of hydrocarbons and oxygenated organic compounds are still further increased by the almost universal use of so-called "leaded" gasoline. A system which will operate with a high degree of effectiveness for long periods of time with an engine operating on non-leaded gasoline may be very quickly rendered almost useless when leaded gasoline is employed.

It is the object of the present invention to provide a catalytic system for the effective elimination of hydrocarbons and oxygenated organic compounds from exhaust gases of internal combustion engines, particularly automotive engines, operating on leaded gasolines, and to provide such a system which is simple in construction and operation, of reasonable cost, relatively small in size, and affording a relatively high degree of elimination of these constituents over a reasonable period of time.

In accordance with the invention it has been found that to achieve this object a catalyst bed of relatively small pellets must be employed and that in particular two essential conditions must be observed. First, the linear velocity of the exhaust gases at the inlet portion of the catalyst bed must be maintained below certain maximum values, and second, the catalyst temperature must not be permitted to exceed certain maximum limits for any substantial periods of time. A detailed explanation of these factors and others of importance affecting the operation of the purifier will be described.

For a better understanding of the invention reference is made to the accompanying drawings in which.

For an understanding of the invention, there will first be described a particular purifier assembly illustrated in FIGURES 1 to 4, though as will appear hereafter this is primarily illustrative since the form of the purifier is subject to quite broad choices of shape, structural details, etc.

Figure 1:
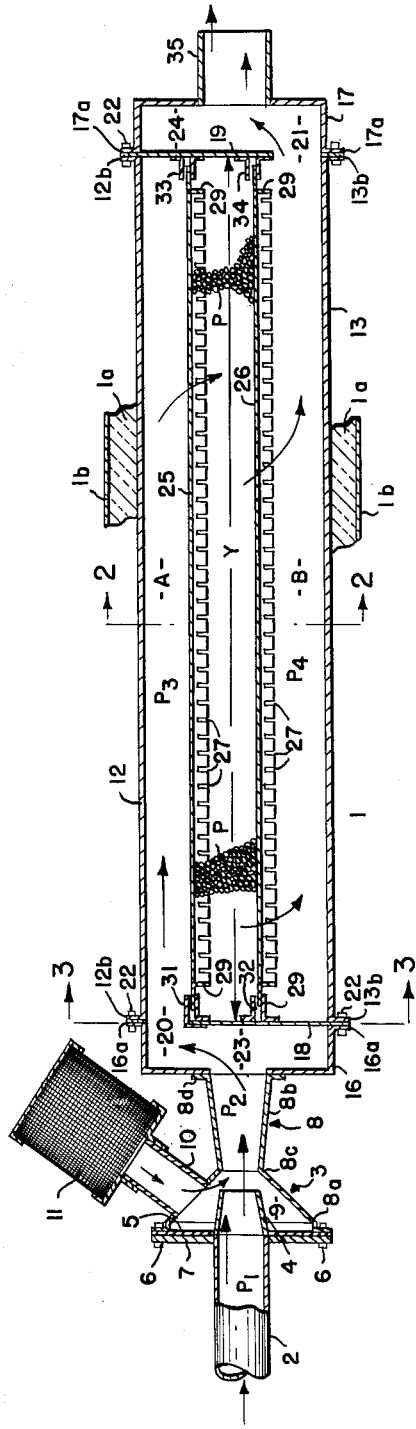
FIG. 1 is a longitudinal cross-sectional view of a purifier adapted to carry out the invention.

Referring to FIG. 1, it may be seen that the purifier includes a metal housing 1 which may be constructed of stainless steel, aluminized steel, or other similar metal having the ability to withstand relatively high temperatures. The housing is covered with suitable heat insulating material 1a protected by a sheet metal covering 1b to avoid undue heat losses which might result in the lowering of the catalyst temperature below the desired level.

The engine exhaust gases are conducted to the housing through a pipe 2 leading from the engine exhaust manifold. Before entering the housing, the exhaust gases pass through a venturi air inspirator designated generally by the reference numeral 3 by means of which the air necessary to supply the oxygen for catalytically oxidizing the oxidizable constituents of the exhaust gases is introduced into and mixed with the exhaust gas stream. The venturi inspirator assembly shown consists of a nozzle portion 4 which converges in the direction of gas flow, this nozzle portion having an integral flange 5 which is in turn bolted as at 6 to a flange 7 which in turn is welded to the pipe 2.

A second member designated generally by the reference numeral 8 has a portion 8a converging in the direction of gas flow and another portion 8b diverging in the direction of gas flow, the two portions 8a and 8b being connected at 8c to form a throat. Member 8, as may be seen, is bolted as shown at 6 to flange 7 at one end, and is bolted or welded to housing 1 at the other end as shown at 8d.

Nozzle 4 is spaced from throat 8c. Converging portion 8a forms a chamber 9 which communicates with the atmosphere through an air inlet conduit 10 equipped with an air filter 11 which prevents road dust and the like from being carried into the purifier system.

In the operation of the venturi inspirator, the flow of exhaust gases through the converging nozzle 4 and the throat 8c creates a reduced pressure at the throat in accordance with the well known principle of a venturi. The system is adjusted so that the pressure at the throat is reduced below atmospheric pressure so that in this way the flow of air is induced through air inlet conduit 10 into chamber 9 from which it flows into and is mixed with the exhaust gases, such that a mixture of air and exhaust gases flows through diverging portion 8b into the purifier housing. The flow of exhaust gases and air is shown by the arrows.

Figure 2:
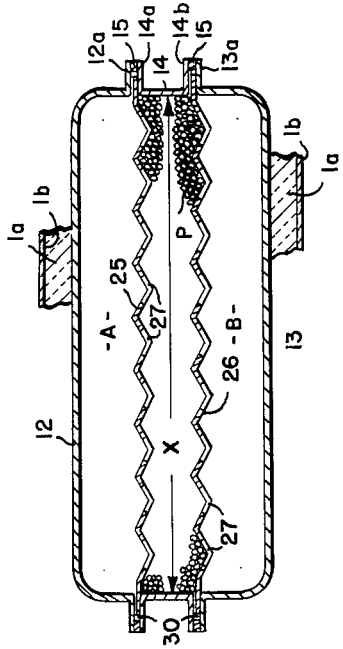
FIGURE 2 is a cross-sectional view taken on the line 2—2 of FIGURE 1.
Figure 3:
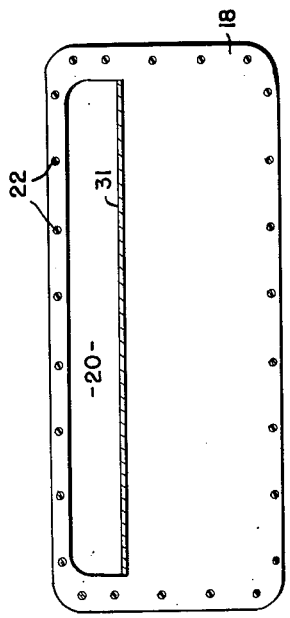
FIGURE 3 is a cross-sectional view taken on the line 3—3 of FIGURE 1.

The central portion of the purifier housing is comprised of an upper U-shaped member 12 and a similar lower U-shaped member 13. Member 12 is provided with lateral flanges 12a (FIG. 2) and with end flanges 12b (FIG. 1) while member 13 is provided with lateral flanges 13a and end flanges 13b. Centrally disposed members 14 provided with upper and lower flanges 14a and 14b connect upper and lower members 12 and 13, the four separate members being joined by means of flanges 12a, 14a and 13a, 14b, as shown in FIG. 2.

Spacer members 15 disposed between flanges 12a and 14a and between flanges 14b and 13a space these flanges apart for a purpose that will be described hereafter. These flanges and spacer members 15 are preferably joined permanently by seam welding.

The end portions of the housing are comprised of dish-shaped members 16 and 17 provided with flanges 16a and 17a respectively. Flanges 16a on end member 16 mate with flanges 12b and 13b on members 12 and 13 respectively, such that end member 16 may be connected to the central portion by means of bolts 22. Similarly, end member 17 is bolted to the central portion by means of flange 17a on end member 17 mating with flanges 12b and 13b on members 12 and 13 respectively.

To support the catalyst bed and to baffle the flow of gases through the housing, flat plates 18 and 19 are provided at the inlet and outlet end respectively of the purifier. As may be seen best in FIGS. 1 and 3, plate 18 is sandwiched between flange 16a of member 16 and flanges 12b and 13b of members 12 and 13, respectively, the whole being fastened together by means of bolts 22 passing through the flanges and the plate 18. Plate 18 is provided with an opening 20 which permits the exhaust gases to pass into the central portion of the housing.

Plate 19 is constructed similarly to plate 18 and is similarly supported between flange 17a, and flange 12b and 13b. It is provided with an opening 21 permitting exhaust gases from the central portion of the housing to pass from the purifier to the atmosphere.

As may be seen, plate 18 creates a chamber 23 at the inlet end of the muffler while plate 19 provides a chamber 24 at the outlet end. Outlet chamber 24 communicates with the atmosphere through outlet pipe 35 which may, or may not, be attached to a conventional acoustic muffler, depending upon requirements.

In the central portion of the purifier housing a pair of perforated grids 25 and 26 are provided which contain between them a bed of small pellets of oxidation catalyst P. For clarity of illustration only a portion of the bed of catalyst pellets has been shown, but it is understood that the entire space between the grids 25 and 26 is filled with catalyst pellets. As may be seen, the bed of pellets is so disposed as to leave an inlet chamber A above the catalyst bed and outlet chamber B below the bed.

Figure 4:
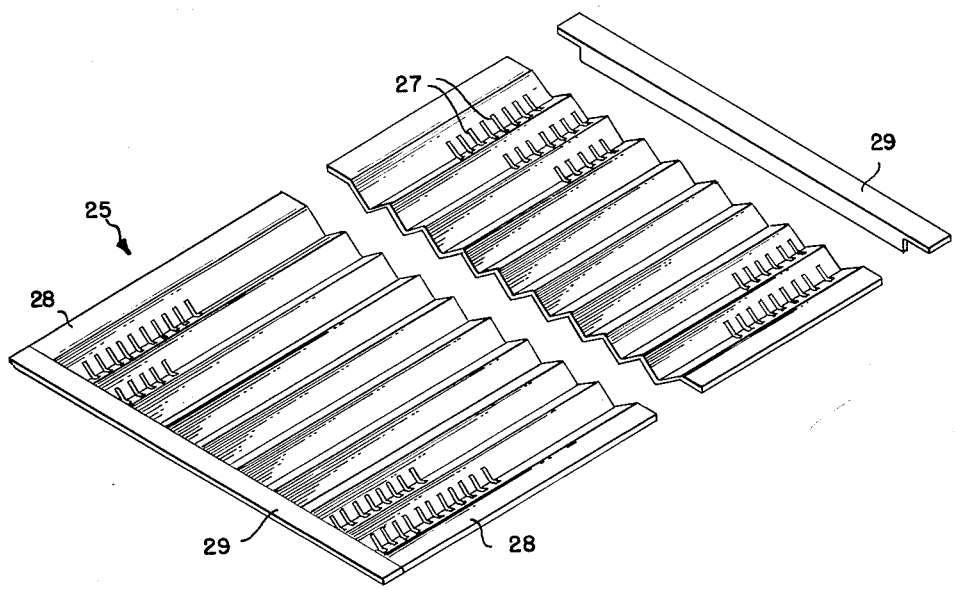
FIGURE 4 is a perspective view, partly exploded, of the type of catalyst-retaining grid employed in the purifier shown in FIGS. 1 and 2.

Referring now to FIG. 4, showing one of the perforated grids in perspective, it may be seen that the grids are formed of corrugated sheet metal, the corrugations running along the length of the grid. The perforations in the grid are in the form of slots 27, these slots being produced by slotting the top portion of the peaks formed by the corrugations on one side of the sheet. The slots may extend into the corrugations one-half the depth of the corrugations, for example, as may be seen in FIGS. 2 and 4. The corrugations in the grids running along their length lend the necessary rigidity to the grids at the high temperatures to which they are exposed.

The grids 25 and 26 are supported in the purifier housing by means of flat, horizontal portions 28 running the length of the grid and by L-shaped brackets 29 which are welded to the ends of the grid as may be best seen in FIGS. 1 and 4.

Longitudinal flat portions 28 are carried in slots 30 formed between flanges 12a and 14a and flanges 14b and 13a by means of spacer elements 15. The thickness of spacer members 15 is slightly greater than the thickness of the sheet from which the corrugated grid is formed, leaving the perforated grids free to undergo slight relative movement with respect to the housing. The lack of any rigid connection between the grids and the housing is of importance in permitting the grids to undergo thermal expansion and contraction independently of the housing under the influence of the high and varying temperatures experienced in the catalyst bed.

As may be seen in FIG. 1, the ends of the grids 25 and 26 are carried by plates 18 and 19 through pairs of brackets 31, 32, 33, and 34, welded to plates 18 and 19. The spacing between these brackets is slightly greater than the thickness of brackets 29 such that the brackets 29 are free to undergo slight relative movement with respect to brackets 31 to 34 for the same purpose as explained above.

The grids 25 and 26 are preferably constructed of stainless steel or other alloy having high corrosion resistance and ability to withstand operating temperatures up to 1800° F. The thickness of the grid should be such as to enable it to withstand temperatures of this order without undergoing sagging, warping, or other types of deformation. In some cases, the corrugations and the slots may be formed in one combined stamping and punching operation. Alternatively, the corrugations may be formed by a stamping or other type of operation and the slots milled into the corrugated sheet, using a gang milling operation.

In operation, the exhaust gases from the engine enter venturi air inspirator 3, effecting inspiration of sufficient air to supply the oxygen required for the subsequent catalytic oxidation of the combustible constituents in these gases. The mixture of air and exhaust gases enters inlet chamber 23 and then passes through opening 20 into upper chamber A where the gases are distributed over the surface of the grid 25. The air-exhaust gas mixture then passes downwardly through the perforated grid 25, through the bed of catalyst pellets P, through the perforations in grid 26 into the lower chamber B and is exhausted to the atmosphere through opening 21, outlet chamber 24, and outlet pipe 35. In passing through the bed of catalyst pellets P, assuming that all factors affecting the catalytic reaction have been properly chosen in a manner which will be subsequently described, the oxidizable constituents in the exhaust gases, including carbon monoxide, hydrocarbons, and oxygenated organic compounds, will be catalytically oxidized in the catalyst bed and the heat liberated from this oxidation plus the sensible heat present in the exhaust gases as exhausted from the engine will serve to maintain the bed of pellets P at an elevated temperature ranging from about 900° F. to 1350° F. over most engine conditions, once effective operation has been initiated, care being taken, however, to prevent the catalyst temperature from substantially exceeding 1350° F. Under these conditions, the gases passing out of the bed of catalyst pellets into chamber B will contain only a satisfactorily small fraction of their original concentration of oxidizable contaminants, the bulk of these contaminants having been catalytically oxidized into carbon dioxide and water vapor.

The term "leaded gasoline" as used in this specification and in the claims, refers to a gasoline to which has been added a compound of lead, usually at the present time tetraethyl lead. This additive is employed in almost all commercial gasoline to improve the gasoline octane rating. Although added in small amounts (such for example as an amount equivalent to 3 grams of metallic lead per gallon of gasoline) its presence in the gasoline critically effects the operation of the exhaust purifier by its effect upon the oxidation catalyst. Under the combustion conditions prevailing in the engine, lead oxides and other lead compounds such as lead chloride and lead bromide and various complexes, are formed in the engine cylinders and are carried out of the engine in the exhaust gases. These compounds are, of course, brought in contact with the catalyst as the exhaust gases pass through the catalyst bed. The presence of the lead halides result from the use of halogenated compounds which are added together with the tetraethyl lead to inhibit the deposition of lead on the cylinder and valve surfaces.

In the operation of the purifier it is important to add the proper quantities of air to the exhaust gases under the various conditions of engine operation. The amount of air added is important in two aspects. First, sufficient air must be added at all times to supply the oxygen required for the oxidation of the combustible constituents; a deficiency of oxygen will, of course, make it impossible for the purifier to operate at good effectiveness. Secondly, the amount of air must be so adjusted as to prevent undue cooling of the catalyst bed. This requires that the maximum proportion of air be introduced into the exhaust gases when the engine is at idling speed (at which condition the concentration of combustible constituents is generally the greatest) and that the proportion of air-to-exhaust gas be smaller at higher engine speeds where the average concentration of combustible constituents is lower. It is not possible to employ the same proportions of air-to-exhaust gas under all engine conditions since if the relatively large proportion of air necessary to provide stoichiometric oxygen at idling is employed at the higher speeds, the large quantities of excess air at the higher speeds will have an undesirable cooling effect upon the catalyst.

Considering the catalyst bed, its geometric shape may be rather arbitrarily chosen having regard to the desirability of approximate uniformity of distribution of the gases to and through the bed. For example, the bed may be "flat," as already described, in the sense of confinement between plane or approximately plane substantially parallel entrance and exit surfaces; or it may be "annular" in the sense of confinement between substantially concentric cylindrical or conical entrance and exit surfaces, the radial cross-sections of the cylindrical or conical surfaces being circular, elliptical, oval or even polygonal and with the flow generally radially inward or outward, the latter usually being preferable because the sensible heat of the gases may be conserved against loss by radiation. The bed might also be confined between concentric spherical segments, or the like. From the standpoint of operating characteristics, any such bed will involve flow lines of approximately equal length between the entrance and exit surfaces. Unless such approximate equality of length of flow lines exists, the pressure drops through various portions of the bed will be unequal leading to unequal distribution of the gases. In common, such beds may be well described with reference to the flow lines and to the cross-sectional surfaces orthogonal to the flow lines, the entrance and exit surfaces being two such orthogonal surfaces. Where orthogonal surfaces are hereafter referred to, it will be understood that orthogonality is referred to the flow lines through a bed. In some instances, the actual bed boundary may not be constituted by an orthogonal surface, but the equivalent orthogonal surface may be considered made up of increments of projection of an actual surface in the direction of flow lines adjacent thereto. In the case of a flat bed all such orthogonal surfaces will generally be approximately equal in area; but for an annular bed the orthogonal surfaces may have areas varying considerably from entrance to exit. In the latter case the linear velocity of the gases at points along a flow line will vary inversely with the areas of the orthogonal surfaces encountered.

So long as flow lines are approximately equal, volume distribution is uniform without the possibility of existence of low resistance channels or regions imposing more activity on some parts of the bed than others.

The pattern of variation during operation of the linear velocity of the gases through the bed, particularly at the entrance thereof to the bed or at their passage through what may be assumed for design purposes to be the initial active orthogonal cross-sectional surface of the bed, is of critical significance. It will be obvious that actual instantaneous velocity varies greatly with conditions of engine operation, and that actual measurements of linear velocity would be difficult. However, linear velocities may be calculated from other measurements, and without going into the matter in detail, it has been found that the proper velocity situation, determinative of the cross-sectional area of an orthogonal surface of the bed may be taken care of in design as follows:

For any engine with which a catalytic bed is to be associated in accordance with the invention, there is a measurable characteristic which may be taken as the starting point of design, since it is determinative of the entrance cross-sectional area of the bed and it has been found that, using this characteristic as a basis, conditions of proper operation result. The characteristic involved is the condition of practical operation of the engine in the driving of a vehicle at which its exhaust gases have the minimum total energy available to the catalyst, total energy here being used in the sense of sensible heat of the gases plus the heat producible by the oxidation of the residual combustible content of the gases. For this condition (determined in actual or simulated road or other use tests) the rate of fuel consumption is determined in pounds of fuel per minute.

The area of the orthogonal cross-section of the catalyst bed constituting the entrance to the region assumed for catalytic activity should then be in the range of 1500 to 32,000 square inches per pound per minute of fuel consumed by the engine under its condition of operation corresponding to minimum total energy of the gases entering the catalyst bed. The upper limit here given is that which, if exceeded, gives no appreciable improvement in life of the catalyst and may lead to cessation of catalytic operation under adverse conditions. (It may be here noted that with some automotive vehicles it may be convenient to provide, for a single engine, a pair of catalyst beds individual to groups of cylinders. In such case bed area refers to the total area of the beds when considered with reference to a single engine.) The lower limit corresponds to the least area likely to be successful with the most favorable minimum exhaust heat content and with besh catalyst characteristics while operating the engine with leaded gasoline. For most present day American automobiles the foregoing range may be 1500 to 24,000 square inches per pound per minute of fuel consumed as stated above.

The optimum part of the foregoing range is 1,800 to 10,000 square inches per pound per minute of fuel consumed as stated above.

Where reference is made to the orthogonal cross-section constituting the entrance to the region assumed for catalytic activity, there is meant the actual entrance cross-sectional area of a flat bed or, in the case of an annular bed some assumed surface which, if flow is outwardly, may be located somewhat outwardly of the inner annular boundary of the bed. Essentially all that is required for this assumption is that there should be sufficient bed beyond the surface in the direction of flow to satisfy the bed thickness requirements which will be hereafter discussed. In such case the portion of the bed preceding that surface may be active at some times and inactive at others, this condition being permissible.

While the criterion for determination of cross-sectional area would appear to be tied up with a particular condition of engine operation, it is found that requirements for satisfactory operation under the wide range of operating conditions encountered are satisfiied. While different leaded fuels commercially available may have somewhat different characteristics, these do not vary to such extent as to give appreciably different results in a bed the cross-sectional area of which is characterized by the foregoing. In fact, in the test of the engine to determine the conditions specified, different fuels may give rise to somewhat different conditions so far as speed or the like is involved, but when the matter is reduced to consumption of fuel at those conditions the criteria specified give esssentially the same results.

It has furthermore been found that the criteria specified hold quite generally for engines of commercial ranges of sizes and characteristics.

The matter of thickness of the bed measured along its flow lines may be best prefaced by consideration of the practical aspect of catalyst pellet size. In general, it has been found desirable to use pellets ranging in mesh from about 7 to 25, while most desirably the pellets are substantially uniform at about 16 mesh. The size of the pellets is not critical, but the lower limit of size is dictated by the practical consideration that at the temperatures involved in the catalyst bed fine mesh wire screens and thin plates are not capable of withstanding the warping and swelling effects existing in the catalyst unit. Accordingly, thicker plates having thicknesses of 0.040 inch and upwards, of stainless steel and heat resistant alloys, must be used. Present practices in slotting or perforating plates of such thickness limit the minimum size of openings to about 0.040 to 0.060 inch in their smallest dimensions. Accordingly, pellets in order to be held thereby must have diameters of not much less than 0.050 inch, and it has been found most satisfactory to provide pellets in the form of cylinders having diameters of 0.050 inch and lengths of about 3/16 inch. The size and shape is not critical, but such cylindrical pellets give, when distributed at random in a bed, desirable pore space and active surface areas and provide passages having satisfactory low resistances to gas flow with avoidance of filtering action which would cause the bed to become plugged by rust and other dust, including the fines produced by attrition of the catalyst. As will immediately appear, larger size pellets require greater minimum thicknesses of catalyst beds and consequently it is desirable to provide pellets of as small size as practical.

Theoretical considerations indicate that for consistent operation of the catalyst bed through a long life of activity there should be provided in the direction of flow lines through the bed a thickness corresponding to a minimum of eight layers of catalyst pellets, arbitrarily defining a "layer" as having a thickness equal to the minimum transverse dimension of a pellet, i.e. the diameter in the case of a cylindrical pellet having a length exceeding its diameter. Considering practical pellet sizes as above, this would involve a minimum bed thickness of about 0.3 inch. From a practical standpoint the bed thickness may range from about 0.3 inch to 3 inches, with the preferable range 0.5 inch to 2 inches. Too thick a bed is undesirable because of increase of back pressure which particularly affects the operation of a Venturi inspirator when used to supply excess air to the engine exhaust gases. Too thin a bed involves the difficulty of insuring proper distribution of pellets fed into the bed to fill voids left by removal of catalyst through attrition. Without proper distribution there may occur thin regions of the bed through which low resistance to flow is offered with the result that bypassing of gases might occur rendering substantial portions of the bed ineffective.

The foregoing gives the criteria for design of a bed, the criteria being obviously applicable to beds of various geometrical shapes with the shapes satisfying the requirements, as indicated above, for uniform distribution of the gases so as to make all parts of the bed effective. While the criteria indicated above should be used for design, it wil be informative to indicate what these criteria amount to in practical application to passenger automobiles of conventional American type. The cross-sectional area of a bed will generally involve 1 to 2.5 square inches per cubic inch of piston displacement, with this figure generally in the range of 1.3 to 2.0. The volume of the bed will generally range from about 1.8 to 4.6 cubic inches per cubic inch of piston displacement. The geometirc surface area presented by the catalyst pellets will generally range from about 115 to 250 square inches per cubic inch of piston displacement, the range generally being between 140 and 180 square inches per cubic inch of piston displacement, with the area generally exceeding 165 square inches per cubic inch of piston displacement.

Assuming a maximum addition of air to the exhaust gases in the proportion by volume of four parts of added air to one part of exhaust gases, temperature ranges of operation of the catalyst bed will generally be between 900° F. to 1350° F., these temperatures corresponding to the effective removal of hydrocarbons and other breakdown products resulting from partial oxidation of the fuel. 1350° F. is a reasonable operating temperature for metals employed for containing the catalyst. (Activity of the catalyst will start at about 550° F., but this corresponds to oxidation of hydrogen and carbon monoxide rather than to oxidation of hydrocarbons and other products in the gas.)

The heat produced by oxidation of hydrogen and carbon monoxide will raise the temperature to the range required for full activity in oxidizing hydrocarbons and other breakdown products.

Suitable oxidation catalysts for use in the exhaust purifier system for engines operating on leaded gasoline include generally catalysts which are capable of operating efficiently over relatively long periods of time at temperatures ranging from about 550° F. to 1350° F. Preferred catalysts comprise a carrier or support of an activated metal oxide, particularly activated alumina, impregnated with metals or metal oxides having oxidation activity such as platinum, palladium, ruthenium, rhodium, copper, silver, chromium, vanadium, manganese, or iron, or mixtures such as mixtures of copper and chromium oxides. Preferred supports or carriers for the above metals or metal oxides comprise pellets of an activated metal oxide, such as pellets or activated alumina, beryllia, thoria, magnesia, zincite or zirconia. As well known in the art, the activated form of these oxides is prepared by the careful dehydration of a hydrated form of the oxide (such as the dehydration of alumina trihydrate at approximately 1000° F.) to produce a dehydrated form having a high specific surface area and large internal pore volume. Activated alumina is particularly preferred as a carrier because of its combination of excellent catalytic and physical properties.

The carrier or support is preferably impregnated with the active component by dipping into a solution of a decomposable compound of the metal, followed by drying and decomposition of the metal salt so as to deposit the metal or its oxide on the surface of the carrier in a finely divided form. Thus, activated alumina pellets may be impregnated with platinum for example by dipping into a 1% solution of chloroplatinic acid ($H_2PtCl_6 \cdot 6H_2O$) followed by drying and decomposition of the platinum salt to deposit finely divided platinum on the surface of the pellets.

While the noble metals, such as platinum and palladium, produce oxidation catalysts of higher initial activity, it has been found that after a relatively short exposure to the exhaust fumes of engines operating on leaded gasoline the activity of noble metal catalysts are reduced to approximately the same level as the activity of less expensive catalysts. For this reason, catalysts containing non-noble metals are generally preferred because of the great difference in cost.

A particularly preferred form of a non-noble metal catalyst which shows sustained activity of a good level after long exposure to exhaust fumes of engines operating on leaded gasoline is a catalyst comprising an activated metal oxide carrier, preferably activated alumina, impregnated with copper and chromium oxides. After exposure to the exhaust fumes from engines operating on leaded gasoline such as catalyst displays an activity approaching closely that of noble metal catalysts when exposed to the same type of stream for the same time. Such a catalyst, in addition, is particularly suitable for the elimination of hydrocarbons from the exhaust gases, which as previously explained are the most objectionable constituents of the exhaust gases from an air pollution aspect. A suitable procedure for the preparation of such a copper-chromium oxide on alumina catalyst is as follows:

Hydrated copper nitrate ($Cu(NO_3)_2 \cdot 3H_2O$) and hydrated chromium nitrate ($Cr(NO_3)_3 \cdot 9H_2O$) are dissolved in water to form a single solution of the two salts in which the mole ratio of copper : chromium is approximately 1:1 and in which the solution contains about 60% by weight of dissolved salts. The solution is acidified by the addition of approximately 400 cc.'s of nitric acid of 70% strength for each eight liters of solution. Pellets of activated alumina are dipped into this solution, after which the pellets are drained, dried at 200° F. and then heated for one hour at a temperature of 400° F. in order to decompose the nitrates. The catalyst is then treated with a fuel-air mixture (such as propane and air) at 700° F. so that catalytic oxidation occurs on the catalyst surface causing the catalyst temperature to rise to 1200° F. The finished pellets contain about 2.5% by weight of copper (as metal) and about 2.1% chromium (as metal).

The Venturi inspirator system is defined in accordance with conventional Venturi design to secure the desired air-to-exhaust gas proportions at idling and the proper decrease in these proportions at high engine speed will be automatically obtained. In this design the pressure drops through the catalytic system following the inspirator are taken into account. The size and shape of nozzle 4 (FIG. 1), the size and shape of the throat 8c, the spacing between nozzle 4 and the throat, and the size of the air inlet 10 is selected so as to provide the desired air-to-exhaust gas proportions at idling speed. In general, the greater the constriction in the nozzle 4 and throat 8c, the higher will be the air-to-exhaust gas ratio. This follows from the well known principle of the venturi that the change in pressure at the venturi throat is roughly proportional to the degree of constriction. The greater the reduction in pressure at the throat 8c of the air inspirator, the greater will be the driving force for the inspiration of air. Thus a decreasing pressure at the venturi throat with increasing constriction in the nozzle 4 results in greater values for the air-to-exhaust- gas proportion.

The proportioning may be further controlled by the size of the air inlet 10, increasing the size of which will result in an increase in the air-to-exhaust gas proportion. In general, it is desirable to reduce the size of the air inlet, obtaining the necesary proportioning at idling by choice of the other dimensions of the venturi since reduction in the inlet area, as by means of an inserted orifice, will have the desired effect of decreasing the proportion of air-to-exhaust gases at higher speeds.

The desirable proportions of air-to-exhaust gas will vary depending upon the average temperature and combustibles content in the exhaust stream. When the particular engine exhaust stream is relatively low in temperature and/or is low in combustibles content as for example would be the case for a well adjusted passenger car engine, the air should be regulated to provide the stoichiometrically required oxygen for oxidizing the combustible constituents plus a slight excess, e.g. 2% excess. When the engine produces an exhaust stream relatively high in temperature and/or combustible constituents it may be desirable in some cases to add substantial quantities of air in excess of stoichiometric oxygen requirements, e.g. 10% to 50% to help maintain the catalyst temperature below temperatures of 1350° F. Above this temperature the catalyst undergoes rapid deactivation in the presence of lead compounds present in the exhaust gases from engines operating on leaded gasoline.

While the invention does not depend upon any theory or explanation of why the effective life of the purifier is so surprisingly extended by operation within the defined range of gas velocities through the catalyst bed, it is believed that this surprising criticality is related to a number of factors. First of all, it has been found that at relatively low catalyst operating temperatures, e.g., 650° F. to 750° F., low gas velocities are required to obtain effective catalytic oxidation of relatively small amounts of hydrocarbons and oxygenated compounds. In most automotive engines the combined chemical and sensible heat present in the exhaust gases is insufficient to raise the catalyst above 750° F. under at least some conditions of operation such as cruising at 35 m.p.h. on level ground. Accordingly the catalyst temperature under some conditions of operation will drop to these levels and to obtain efficient hydrocarbon oxidation under these conditions gas velocities resulting from the limits defined above must be employed.

The second factor which is believed responsible for the critical importance of the above-defined exhaust gas velocity is the cooling effect of the exhaust gases on the catalyst at relatively low exhaust gas temperatures. Under certain engine conditions, particularly at idling, the temperature of the gas-air mixture entering the catalyst bed is well below the minimum activation temperature of the catalyst, namely that temperature at which the catalytic reaction begins to occur at an appreciable rate. Thus, for example, at idling the exhaust gas-air mixture entering the catalyst bed will usually be of the order of 200° F. to 250° F. while the minimum activation temperature of the catalyst may be of the order of 450° F. to 650° F. Since relatively high rates of heat exchange are experienced between a gas stream and a bed of small particles, the low temperature gas stream at excessively high velocities exerts a pronounced cooling effect upon the catalyst pellets with which it comes in contact. If this cooling rate, as the cool gas stream passes over the first layer of catalyst pellets, exceeds the rate of reaction at the surface of the catalyst pellets the catalyst temperature in the first layer may fall below its activation temperature causing the reaction to cease. When heat is no longer liberated by the first layer of pellets, the second layer undergoes cooling in a similar manner such that a cooling wave is propagated through the pellet bed cooling a portion, or in some cases the entire bed, down below the temperature at which catalytic oxidation occurs. With increasing linear velocity of the gases over the catalyst the rate of heat exchange between the gas and the catalyst, and hence the cooling effect of a low temperature gas, also increases. For these reasons it is believed that the relatively low linear velocities of the exhaust gases resulting from the conditions defined above are necessary to avoid excessive cooling effect of low temperature exhaust gases on the catalyst.

A third factor which is believed to explain the critical effect of the exhaust gas velocity on the catalyst is related to the characteristic way in which the catalyst activity declines upon exposure to lead compounds present in the exhaust gases. It has been found that on such exposure, the catalytic activity declines quite rapidly at first to a plateau of relatively stable activity, after which the decline is much slower. This characteristic decline activity affects various types of catalysts in substantially the same manner. In fact, after leveling off of the activity decline, the difference in the activity of the various catalysts, for example the difference in activity level between a platinum and a copper-chrome catalyst is not substantial, although the difference in activity level may be appreciable before that exposure.

With lowered catalyst activity, the maximum permissible linear velocity over the catalyst at low gas temperatures is also decreased. Thus, it has been found that the linear velocity over the catalyst must be chosen with respect to the plateau of lowered activity to which the catalyst declines after exposure to the lead compound-laden exhaust gases. If the linear exhaust gas velocity through the catalyst is chosen with respect to the activity of a new catalyst before such exposure rather than with respect to the activity plateau to which it falls following such exposure, the efficiency of the purifier quickly falls to an unacceptable level because of excessively high linear gas velocity through the bed.

This application is in part a continuation of my application, Serial Number 622,152, filed November 14, 1956, now abandoned.

What is claimed is:

1. In combination with a spark-ignition reciprocating internal combustion engine adapted to operate on leaded gasoline fuel, means for admixing air with the exhaust gases, and catalytic exhaust purifier means receiving the exhaust gases and added air and comprising a housing and a bed of oxidation catalyst, in the form of pellets distributed at random, within said housing, said housing being provided with means for guiding the exhaust gases and added air through said bed, said bed presenting to the exhaust gases and added air a cross-sectional area orthogonal to the flow directions therethrough which is in the range of 1500 to 32,000 square inches per pound per minute of fuel consumed by the engine under its condition of operation corresponding to minimum total energy of the mixture of exhaust gases and added air entering the catalyst bed, and said bed having an approximately uniform thickness in the direction of flow within the range of approximately 0.3 inch to 3 inches, said catalyst pellets providing a geometric surface area in the range of 115 to 250 square inches per cubic inch of engine piston displacement.

2. In combination with a spark-ignition reciprocating internal combustion engine adapted to operate on leaded gasoline fuel, means for admixing air with the exhaust gases, and catalytic exhaust purifier means receiving the exhaust gases and added air and comprising a housing and a bed of oxidation catalyst, in the form of pellets distributed at random, within said housing, said housing being provided with means for guiding the exhaust gases and added air through said bed, said bed presenting to the exhaust gases and added air a cross-sectional area orthogonal to the flow directions therethrough which is in the range of 1,500 to 10,000 square inches per pound per minute of fuel consumed by the engine under its condition of operation corresponding to minimum total energy of the mixture of exhaust gases and added air entering the catalyst bed, and said bed having an approximately uniform thickness in the direction of flow within the range of approximately 0.3 inch to 3 inches, said catalyst pellets providing a geometric surface area in the range of 115 to 250 square inches per cubic inch of engine piston displacement.

3. In combination with a spark-ignition reciprocating internal combustion engine adapted to operate on leaded gasoline fuel, means for admixing air with the exhaust gases, and catalytic exhaust purifier means receiving the exhaust gases and added air and comprising a housing and a bed of oxidation catalyst, in the form of pellets distributed at random, within said housing, said housing being provided with means for guiding the exhaust gases and added air through said bed, said bed presenting to the exhaust gases and added air a cross-sectional area orthogonal to the flow directions therethrough which is in the range of 1,800 to 10,000 square inches per pound per minute of fuel consumed by the engine under its condition of operation corresponding to minimum total energy of the mixture of exhaust gases and added air entering the catalyst bed, and said bed having an approximately uniform thickness in the direction of flow within the range of approximately 0.5 inch to 2 inches, said catalyst pellets providing a geometric surface area in the range of 115 to 250 square inches per cubic inch of engine piston displacement.

4. The combination according to claim 1 in which the means for admixing air with the exhaust gases comprises an inspirator energized by the engine exhaust gases to effect the inflow and admixture of air.

5. The combination according to claim 1 in which the pellets are in the size range from 7 to 25 mesh.

6. The combination according to claim 1 in which the pellets are approximately cylindrical and have diameters of the order of 0.05 inch and lengths of the order of 3/16 inch.

References Cited in the file of this patent
UNITED STATES PATENTS

| | | |
|---|---|---|
| 2,330,664 | Bennett | Sept. 28, 1943 |
| 2,664,340 | Houdry | Dec. 29, 1953 |
| 2,674,521 | Houdry | Apr. 6, 1954 |
| 2,747,976 | Houdry | May 29, 1956 |